US007230043B2

(12) United States Patent
Klun et al.

(10) Patent No.: US 7,230,043 B2
(45) Date of Patent: Jun. 12, 2007

(54) HYDROPHILIC POLYMER COMPOSITION

(75) Inventors: Thomas P. Klun, Lakeland, MN (US); Larry D. Boardman, Woodbury, MN (US); Richard B. Ross, Cottage Grove, MN (US); Gregg A. Caldwell, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 330 days.

(21) Appl. No.: 10/935,018

(22) Filed: Sep. 7, 2004

(65) Prior Publication Data

US 2006/0052495 A1    Mar. 9, 2006

(51) Int. Cl.
*C08G 59/50* (2006.01)
*C08K 5/41* (2006.01)

(52) U.S. Cl. ..................... 524/167; 524/243
(58) Field of Classification Search ............... 524/167, 524/243
See application file for complete search history.

(56) References Cited

U.S. PATENT DOCUMENTS

| 2,232,905 A | 2/1941 | Dyer |
| 2,723,999 A | 11/1955 | Cowen et al. |
| 2,803,656 A | 8/1957 | Ahlbrecht et al. |
| 2,915,554 A | 12/1959 | Ahlbrecht et al. |
| 3,426,754 A | 2/1969 | Bierenbaum et al. |
| 3,489,148 A | 1/1970 | Duncan et al. |
| 3,592,194 A | 7/1971 | Duncan |
| 3,787,351 A | 1/1974 | Olson |
| 3,856,005 A | 12/1974 | Sislian |
| 3,860,003 A | 1/1975 | Buell |
| 3,911,499 A | 10/1975 | Benevento et al. |
| 3,971,373 A | 7/1976 | Braun |
| 4,100,324 A | 7/1978 | Anderson et al. |
| 4,379,192 A | 4/1983 | Wahlquist et al. |
| 4,419,993 A | 12/1983 | Petersen |
| 4,429,001 A | 1/1984 | Kolpin et al. |
| 4,515,841 A | 5/1985 | Dyke |
| 4,619,976 A | 10/1986 | Morris et al. |
| 4,843,134 A | 6/1989 | Kotnour et al. |
| 4,845,779 A | 7/1989 | Wheeler et al. |
| 4,849,458 A | 7/1989 | Reed et al. |
| 4,857,251 A | 8/1989 | Nohr et al. |
| 4,920,168 A | 4/1990 | Nohr et al. |
| 4,920,960 A | 5/1990 | Hubbard et al. |
| 4,954,395 A | 9/1990 | Hasegawa et al. |
| 4,976,274 A | 12/1990 | Hanssen |
| 5,084,340 A | 1/1992 | Light |
| 5,145,727 A | 9/1992 | Potts et al. |
| 5,149,576 A | 9/1992 | Potts et al. |
| 5,173,291 A | 12/1992 | Brink et al. |
| 5,244,951 A | 9/1993 | Gardiner |
| 5,300,357 A | 4/1994 | Gardiner |
| 5,605,750 A | 2/1997 | Romano et al. |
| 5,653,699 A | 8/1997 | Reed et al. |
| 5,677,067 A | 10/1997 | Kojima et al. |
| 5,688,884 A | 11/1997 | Baker et al. |
| 5,804,625 A | 9/1998 | Temperante et al. |
| 5,804,626 A | 9/1998 | Rogers et al. |
| 5,901,706 A | 5/1999 | Griesbach et al. |
| 5,935,370 A | 8/1999 | Weimer et al. |
| 5,976,673 A | 11/1999 | Aoki |
| 5,981,038 A | 11/1999 | Weimer et al. |
| 6,127,485 A | 10/2000 | Klun et al. |
| 6,380,289 B1 | 4/2002 | Thompson, Jr. et al. |
| 6,664,354 B2 | 12/2003 | Savu et al. |
| 2003/0138612 A1 | 7/2003 | Kody et al. |

FOREIGN PATENT DOCUMENTS

| EP | 0 368 514 A1 | 5/1990 |
| EP | 0 516 271 A1 | 12/1992 |
| WO | WO 92/18569 A1 | 10/1992 |
| WO | WO 95/01396 A1 | 1/1995 |
| WO | WO 00/69950 A1 | 11/2000 |
| WO | WO 01/30873 A1 | 5/2001 |

OTHER PUBLICATIONS

"Organofluorine Chemicals and Their Industrial Applications", Edited R. E. Banks, (1979), The Society of Chemical Industry, London/Ellis Horwood Ltd.

J. O. Hendricks, "Industrial Fluorochemicals", Industrial and Engineering Chemistry, (1953), pp. 99-105, vol. 45, American Chemical Society, Washington, D.C.

M. K. Bernett et al., "Wetting of Low-Energy Solids by Aqueous Solutions of Highly Fluorinated Acids and Salts", Journal of Physical Chemistry, (Nov. 18, 1959), pp. 1911-1916, vol. 63, No. 11, American Chemical Society.

V. A. Wente, "Superfine Thermoplastic Fibers", Industrial and Engineering Chemistry, (1956), pp. 1342-1346, vol. 48, American Chemical Society, Washington D.C.

V. A. Wente et al., "Manufacture of Superfine Organic Fibers", NRL Report No. 4364, (May 25, 1954), pp. 1-15, Naval Research Laboratory, Washington, D.C.

C. N. Davies, "The Separation of Airborne Dust and Particles", Institution of Mechanical Engineers, (1952), pp. 185-198, vol. 1B, No. 5.

"Preparation, Properties, and Industrial Applications of Organofluorine Compounds", Edited by R. E. Banks, (1982), p. 26, Ellis Horwood Ltd.

Primary Examiner—Peter D. Mulcahy
(74) Attorney, Agent, or Firm—Kent S. Kokko

(57) ABSTRACT

A hydrophilic polymer composition is described comprising thermoplastic of thermoset polymer, and a fluorochemical additive dispersed therein. The hydrophilic composition is useful, for example, in medical and surgical drapes.

30 Claims, No Drawings

HYDROPHILIC POLYMER COMPOSITION

FIELD OF THE INVENTION

The present invention relates to a hydrophilic polymer composition comprising a thermoplastic or thermoset polymer, and a fluorochemical additive dispersed therein. The present invention also relates to a method of making such compositions. The hydrophilic composition is useful, for example, in medical and surgical drapes.

BACKGROUND

Thermoplastic polymers are widely employed to create a variety of products, including blown and cascade films, extruded sheets, foams, fibers and products made therefrom, woven and knitted fabrics, and non-woven fibrous webs. Many thermoplastic polymers used in these products, such as polypropylene, are inherently hydrophobic, and there are a number of uses for thermoplastic polymers where their hydrophobic nature either limits their use or requires some effort to modify the surface of the shaped articles made therefrom. For example, polyolefins are used in the manufacture of nonwoven webs that are employed in the construction of absorbent articles such as diapers, feminine care products, and personal incontinence products, and the use of such articles self-evidently are limited because of their hydrophobic nature.

When fiber, and the fabrics made therefrom, is still hydrophilic after drying following contact with deionized water, the fiber or fabric is considered durably hydrophilic. Hydrophilic fiber may be obtained by topically spraying or coating the hydrophobic fiber with certain surfactants and subsequently drying the fiber or fabric. Typically, however, the surfactant that remains on the fiber using this technique is diminished or lost completely upon contact with an aqueous medium, e.g. water, and thus the hydrophilicity of the fibers is only poorly durable. Hydrophilicity, or the lack thereof, can be measured in a variety of ways. For example, when water contacts a nonwoven web that has lost its hydrophilicity, the water does not flow, or flows undesirably slowly, through the web.

WO 92/18569 and WO 95/01396 describe fluorochemical additives for use in the extrusion of thermoplastic polymers to prepare films and fibers with repellency properties. It is specifically disclosed that films can be prepared with good anti-wetting properties. It is further taught that polypropylene films with the fluorochemical dispersed therein have good antistatic properties.

The addition of one or more surfactants to the melts of thermoplastic polymers to impart hydrophilicity to both the surface and the bulk of the fiber is also taught in the art. U.S. Pat. Nos. 4,857,251 and 4,920,168 (Nohr et al.) describe a method of forming fibers by melt-extrusion of a surface segregatable thermoplastic composition that comprises thermoplastic polymer and siloxane-containing additive having certain moieties. After the fibers are formed, they are heated from 27° C. to 95° C. for a period of time sufficient to increase the amount of additive at the fiber surface. The resulting fibers exhibit increased surface hydrophilicity compared to fibers prepared from the thermoplastic alone.

U.S. Pat. No. 5,244,951 (Gardiner) describes a durably hydrophilic fiber comprising thermoplastic polymer and fluoroaliphatic group-containing non-ionic compound dispersed within said fiber and present at the surface of the fiber.

U.S. Pat. No. 5,804,625 (Temperante et al.) discloses the addition to the polymer melt of a blend of one or more nonionic fluorochemical surfactants and one or more non-ionic, non-fluorinated, poly(oxyethylene) group containing surfactants to impart durable hydrophilicity to the surface of an article extruded from the polymer. Particular articles that can be produced and provided with durable hydrophilicity at the surface include fibers, fabrics and films.

EP 0 516271 discloses the use of a fluoroaliphatic group containing nonionic compound in the extrusion of polypropylene fibers to impart durable wettability properties to the fiber's surface. Particularly exemplified compounds are those that have a perfluorinated alkyl group linked to a poly(oxyalkylene) group terminated with a hydroxyl group or a lower alkyl ether.

Coating methods to provide a hydrophilic surface are known, but also have some limitations. First of all, the extra step required in coating preparation is expensive, time consuming and involves safety and environmental issues. Many of the solvents used for coating are flammable liquids or have exposure limits that require special production facilities. Furthermore the quantity of surfactant is limited by the solubility in the coating solvent and the thickness of the coating.

SUMMARY

Briefly, in one aspect, this invention provides durably hydrophilic, polymer compositions comprising a thermoplastic polymer, such as polyamide, polyurethane, or polyolefin, e.g., polypropylene, or a thermoset polymer, such as an epoxy polymer, and one or more hydrophilic fluorochemical additives. The additive is present in the composition in an amount sufficient to impart durable hydrophilicity to the thermoplastic or thermoset polymer at its surface.

The compositions of this invention, which comprise a three-component blend of first polymer, second polymer and surface-modifying additive, have enhanced surface-modification, for example, increased water repellency or hydrophilicity, compared to two-component blends of thermoplastic polymer and surface-modifying additive, or two-component blends of first and second polymer.

The surface-modifying additive is present in an amount sufficient to impart desired properties to the surfaces of shaped articles of the composition. Said second polymer is present in an amount sufficient to increase the effect of said surface-modifying additive, i.e., an equal surface-modification may be obtained with less additive, or a greater surface modification may be obtained with an equivalent amount of additive. Said first polymer and said second polymer can each be a single polymer or a mixture of polymers.

As used herein, "major" and "minor" amounts means that there is more of the major amount than of the minor amount. As used herein, "polymer" means a polymer or a mixture of polymers. For example, said first polymer can be polypropylene or a mixture of several polypropylenes. The compositions of this invention, which comprise a three-component blend of first polymer, second polymer and fluorochemical additive, have enhanced hydrophilicity compared to two-component blends of thermoplastic polymer and the fluorochemical additive, or two-component blends of first and second polymer.

In another aspect, the present invention provides durably hydrophilic films and fibers and durably hydrophilic fabrics and webs constructed from said fibers. The invention also provides useful articles made from durably hydrophilic fabrics and webs including medical drapes, filter media, industrial wipes and battery separators that comprise the fabric of the invention which functions as the aqueous media absorbent structure in the articles.

In yet another aspect, this invention provides multi-layer, aqueous liquid-absorbent articles comprising an aqueous media impervious backing sheet, an aqueous media permeable topsheet, and an aqueous liquid-absorbent (i.e., hydrophilic) layer constructed of the above-described web or fabric juxtaposed therebetween useful, for instance, in constructing disposable diapers, wipes or towels, medical drapes, battery separators and incontinence pads.

This invention also provides a method of preparing durably hydrophilic compositions from a mixture or blend of thermoplastic polymer, and hydrophilic fluorochemical additives. The melt of the mixture or blend is processed or shaped, for example, by extrusion or molding to produce fibers with the hydrophilic fluorochemical additives dispersed within the fiber and present at the surfaces of the fiber to render those surfaces durably hydrophilic.

It will be understood that in connection with the present invention the use of the term "dispersed therein" denotes merely the presence of the non-ionic fluorochemical additive in the thermoplastic or thermoset polymer without limitation as to where the non-ionic fluorochemical additive is located. Thus, the fluorochemical additive may be uniformly dispersed in the bulk of the polymer, or a major portion of the non-ionic fluorochemical additive may have migrated to the surface of the thermoplastic or thermoset polymer or fiber.

As used herein, "hydrophilic" is used only to refer to the surface characteristics of the polymer, i.e., that it is wet by aqueous solutions, and does not express whether or not the layer absorbs aqueous solutions. Accordingly, a thermoplastic or thermoset polymer layer may be referred to as hydrophilic whether or not the layer is impermeable or permeable to aqueous solutions. Hydrophilicity is measured by the Hydrophilic Test described herein.

"Alkyl" means a linear or branched saturated monovalent hydrocarbon radical having from one to about twelve carbon atoms or a branched saturated monovalent hydrocarbon radical, e.g., methyl, ethyl, 1-propyl, 2-propyl, pentyl, and the like.

"Alkylene" means a linear saturated divalent hydrocarbon radical having from one to about twelve carbon atoms (or a branched saturated divalent hydrocarbon radical), e.g., methylene, ethylene, propylene, 2-methylpropylene, pentylene, hexylene, and the like.

"Aliphatic" means a linear or branched saturated mono- or polyvalent hydrocarbon radical.

"Perfluorinated" means an organic group wherein all or essentially all of the carbon bonded hydrogen atoms are replaced with fluorine atoms, e.g. perfluoroalkyl, and the like.

"Heteroalkyl" has essentially the meaning given above for alkyl except that one or more heteroatoms (i.e. oxygen, sulfur, and/or nitrogen) may be present in the alkyl chain, these heteroatoms being separated from each other by at least one carbon, e.g., $CH_3CH_2OCH_2CH_2—$, $CH_3CH_2OCH_2CH_2OCH(CH_3)CH_2—$, $C_4F_9CH_2CH_2SCH_2CH_2—$, and the like.

"Heteroalkylene" has essentially the meaning given above for alkylene except that one or more heteroatoms (i.e. oxygen, sulfur, and/or nitrogen) may be present in the alkylene chain, these heteroatoms being separated from each other by at least one carbon, e.g., $—CH_2OCH_2O—$, $—CH_2CH_2OCH_2CH_2—$, $—CH_2CH_2N(CH_3)CH_2CH_2—$, $—CH_2CH_2SCH_2CH_2—$, and the like.

"Perfluoroalkyl" has essentially the meaning given above for "alkyl" except that all or essentially all of the hydrogen atoms of the alkyl radical are replaced by fluorine atoms and the number of carbon atoms is from 1 to about 12, e.g. perfluoropropyl, perfluorobutyl, perfluorooctyl, and the like.

DETAILED DESCRIPTION

The hydrophilic fluorochemical additive is of the general formula:

$$R_f—Q—Y—Q'—R_h,$$ (Formula I), wherein $R_f$ is a fluoroaliphatic group having at least 3 to 5 fully-fluorinated carbon atoms that may be straight-chained or branched. The skeletal chain in the fluoroaliphatic radical can include one or more catenary heteroatoms, such as oxygen, hexavalent sulfur (such as $—SF_4—$), and trivalent nitrogen atoms bonded only to carbon atoms of the skeletal chain. Fully fluorinated fluoroaliphatic groups are preferred, but hydrogen or chlorine atoms may be present as substituents, as long as no more than one of either atom is present for every two carbon atoms. Fluoroaliphatic radicals containing from about 3 to about 5 carbon atoms are most preferred, for reasons of performance, and thermal stability in the melt. Generally, $R_f$ will contain between about 40 and about 78 weight percent fluorine. The terminal portion of the $R_f$ group preferably contains at least three fully fluorinated carbon atoms, e.g., $CF_3CF_2CF_2—$, and particularly preferred compounds are those in which the $R_f$ group is fully or substantially completely fluorinated, as in the case where $R_f$ is a perfluoroalkyl, e.g., $CF_3(CF_2)_{2-4}—$. Suitable $R_f$ groups include, for example, $C_4F_9—$, $C_3F_7—$, and $C_5F_{11}—$.

Q in Formula I above is a divalent linking group, or is a covalent bond, that provides a means to link the $R_f$ group with the depicted hydrophilic "Y" group, which is a non-ionic, water-solubilizing group; Q can comprise a substituted or unsubstituted alkylene group, e.g., $—C_nH_{2n}—$ or $—CH_2CH(OH)CH_2—$; Q can comprise a heteroatom-containing group, e.g., a group such as $—S—$, $—O—$, $—CO—$, $—SO_2—$, or $—N(R)—$ (where R is a hydrogen or a $C_1$ to $C_6$ substituted or unsubstituted alkyl group that may comprise a catenary heteroatom such as O, N or S); or Q can comprise a combination of such groups such as would give, for example, $—CON(R)—$, $—SO_2N(R)—$, $—CH_2CH_2SO_2N(R)—$, $—SO_3C_6H_4N(R)—$, $—SO_2N(R)C_nH_{2n}O[CH_2CH(CH_2Cl)O]_gCH_2CH(CH_2Cl)O—$ (n=1 to 6; g=1 to 10), $—SO_2N(R)C_2H_4OCH_2CH(OH)CH_2O—$, $—SO_2N(R)C_2H_4OCH_2CH(OH)CH_2O—$, $—SO_2N(R)CH_2CH(OH)CH_2NHCH(CH_3)CH_2O—$, $—SO_2N(R)CH_2CH(OH)CH_2O—$, $—(CH_2)_2S(CH_2)_2O—$, and $—(CH_2)_4SCH(CH_3)CH_2—O—$.

Y in Formula I represents a nonionic, water-solubilizing group comprising a poly(oxyalkylene) group, $(R'O)_x$, where R' is an alkylene group having from 2 to about 4 carbon atoms, such as $—CH_2CH_2—$, $—CH_2CH_2CH_2—$, $—CH(CH_3)CH_2—$, and $—CH(CH_3)CH(CH_3)—$, and x is a number between about 8 and about 15 inclusive; Y preferably contains a poly(oxyethylene) group. The oxyalkylene units in said poly(oxyalkylene) can be the same, such as in poly(oxypropylene) or poly(oxyethylene), or can be present as a mixture, such as in a straight or branched chain of randomly distributed oxyethylene and oxypropylene units, i.e., poly(oxyethylene-co-oxypropylene), or as in straight or branched chain blocks of oxypropylene units.

The Y group is terminated for example with a $C_8$–$C_{15}$ alkyl group, an aryl group or combination thereof; and is represented in Formula I as $R_h$. $R_h$ and Y are linked by linking group Q', which is selected from a covalent bond, —$(C_mH_{2m})C(O)O$—, where m=1 to 3, and —$C(O)$—.

Specific examples of non-ionic fluorochemical additives for use in the invention include:

$C_3F_7SO_2N(C_2H_5)(CH_2CH_2O)_xC_8H_{17}$,
$C_3F_7SO_2N(CH_3)(CH_2CH_2O)_xC_8H_{17}$,
$C_4F_9SO_2N(C_2H_5)(CH_2CH_2O)_xC_8H_{17}$,
$C_4F_9SO_2N(CH_3)(CH_2CH_2O)_xC_8H_{17}$,
$C_4F_9SO_2N(CH_3)(CH_2CH_2O)_xCH[CH_2CH(CH_3)_2][CH_2CH(CH_3)\ CH_2CH(CH_3)_2]$,
$C_4F_9SO_2N(C_2H_5)(CH_2CH_2O)_xCH[CH_2CH(CH_3)_2][CH_2CH\ (CH_3)CH_2CH(CH_3)_2]$,
$C_3F_7SO_2N(CH_3)(CH_2CH_2O)_xCH[CH_2CH(CH_3)_2][CH_2CH(CH_3)\ CH_2CH(CH_3)_2]$,
$C_5F_{11}SO_2N(CH_3)(CH_2CH_2O)_xCH[CH_2CH(CH_3)_2][CH_2CH(CH_3)CH_2CH(CH_3)_2]$,
$C_5F_{11}SO_2N(CH_3)(CH_2CH_2O)_xC_{10}H_{21}$,
$C_4F_9SO_2N(CH_3)(CH_2CH_2O)_xC_6H_4$—$C(CH_3)_2$—$CH_2$—$C(CH_3)_3$,
$C_5F_{11}SO_2N(CH_3)(CH_2CH_2O)_xC_{14}H_{29}$,
$C_3F_7SO_2N(CH_3)(CH_2CH_2O)_xC_6H_4$—$C_8H_{17}$,
$C_4F_9SO_2N(CH_3)CH_2CH(OH)CH_2O(CH_2CH_2O)_xC_6H_4C(CH_3)_2$—$CH_2$—$C(CH_3)_3$,
$C_4F_9SO_2N(CH_3)CH_2CH(OH)CH_2O(CH_2CH_2O)_xCH[CH_2CH(CH_3)_2][CH_2CH(CH_3)CH_2CH(CH_3)_2]$, and
$C_4F_9SO_2N(CH_3)(CH_2CH_2O)_xC(O)$—$C_{11}H_{23}$, wherein x for each of the depicted compounds is 8–15.

The compounds of Formula I provide durable hydrophilicity to the polymer composition, and advantageously are generally more thermally stable than other polymer additives, including homologous compounds having longer (e.g. $C_8F_{17}$—) perfluoroalkyl groups. Applicants have determined that compounds like those of Formula I, but having shorter $R_h$ groups, are generally less thermally stable than those having $R_h$ groups as defined. Further, it has been discovered that compounds of Formula I, having $C_3$–$C_5$ fluoroalkyl groups, provide performance comparable to or better than those having longer, e.g. perfluorooctyl, flouoralkyl groups. As described further herein, $C_3$–$C_5$ perfluoroalkyl groups are more cost-effective and environmentally favored, therefore performance need not be sacrificed to cost or environmental concerns.

Fluoroaliphatic group-containing fluorochemical of Formula I may be prepared using known methods including those methods described in U.S. Pat. No. 2,915,554 (Albrecht et al.). The Albrecht patent discloses the preparation of fluoroaliphatic group-containing nonionic compounds from active hydrogen-containing fluorochemical intermediates, such as fluoroaliphatic alcohols, acids, and sulfonamides by reaction of the intermediates with, for example, ethylene oxide.

Analogous compounds may be prepared by treating the fluorochemical intermediate with propylene oxide. The fluoroaliphatic oligomers disclosed in U.S. Pat. No. 3,787,351 (Olson), certain fluorinated alcohol-ethylene oxide condensates described in U.S. Pat. No. 2,723,999 (Cowen et al.), and U.S. Pat. No. 5,804,626 (Temperante et al.), whose descriptions are incorporated herein by reference, are also considered useful. Fluoroaliphatic group-containing nonionic additives containing hydrophobic long chain hydrocarbon groups may be prepared by reacting a fluoroaliphatic epoxide with, for example, an ethoxylated alkylphenol or alcohol in the presence of $BF_3$-etherate. They may also be prepared by first converting the ethoxylated alcohol to a chloride by reaction with thionyl chloride, then reacting the resulting chloride with a fluoroaliphatic sulfonamide containing an active hydrogen, in the presence of sodium carbonate and potassium iodide.

With respect to the fluorochemical additives of Formula I, it is preferred the $R_f$ groups thereof contain $C_3$ to $C_5$ perfluoroalkyl groups. Heretofore it has been believed that perfluoroalkyl groups having at least 8 carbon atoms were necessary for adequate performance, and the performance of lower perfluoroalkyl groups degraded with decreasing carbon number. The performance of the present compositions are surprising in view of teachings that the lower perfluoroalkyl groups were significantly less effective than longer chain perfluoroalkyl groups, such as the perfluorooctyl group in surfactants. For example, it has been demonstrated that surfactants derived from perfluorocarboxylic acids and perfluorosulfonic acids exhibit considerable differences in performance as a function of chain length. See, for example *Organofluorine Chemicals and their Industrial Applications*, edited by R. E. Banks, Ellis Horwood Ltd. (1979), p56; J. O. Hendrichs, *Ind. Eng Chem.*, 45, 1953, p103; M. K. Bernett and W. A. Zisman, *J. Phys. Chem.*, 63, 1959, p1912.

Fluorochemical compositions have achieved widespread use in a variety of applications, including, for example, in oil- and/or water-repellent compositions, and in surfactant compositions. Some known fluorochemical compositions ultimately degrade to perfluorooctyl-containing compounds when exposed to biological, thermal, oxidative, hydrolytic and photolytic conditions found in the environment. It has been reported that certain perfluorooctyl-containing compounds ($C_8F_{17}$—) may tend to bio-accumulate in living organisms; this tendency has been cited as a potential concern regarding some fluorochemical compositions. For example, see U.S. Pat. No. 5,688,884 (Baker et al.). As a result, there is a desire for fluorine-containing compositions that provide desired functional properties, e.g., water- and oil- repellency, surfactant properties, etc. while eliminating more effectively from biological systems.

The present compositions provide additional advantages. First, the reactive fluorochemical precursors to the additives containing the shorter fluoroalkyl groups may be produced at a lower cost per weight because of higher yields in their synthesis than precursors with longer fluoroalkyl groups. For example, the heptafluorobutyryl fluoride precursor may be prepared in yields of 60% as compared to perfluorooctanoyl fluoride precursor (31%) in an electrochemical fluorination process (*Preparation, Properties, and Industrial Applications of Organofluorine Compounds*, edited by R. E. Banks, Ellis Horwood Ltd (1982), p 26). Also, in comparing analogous fluorochemical additives, the additives of the invention containing shorter fluoroalkyl groups generally impart equal or better hydrophilicity at the same weight basis compared to additives with longer fluoroalkyl groups. Moreover, the additives of the invention containing shorter fluoroalkyl groups (e.g. $C_4F_9$), when compared to additives containing longer fluoroalkyl groups (e.g. $C_8F_{17}$) surprisingly show thermal stability that is generally better, despite their lower molecular weight. Furthermore, the short chain carboxylic acids (the presumed intermediate degradation products) are less toxic and less bioaccumulative than the longer chain homologues.

Useful thermoplastic polymers include synthetic linear polyamides (e.g., nylon 6, nylon 11, nylon 12, nylon 66, nylon 46, nylon 610, nylon 612, etc.), polyesters, polyimides, polyamides, polysulfones, polyetherimides, polycarbonates, polyethersulfones, polyetherketones, polyphenylenes, polyphenylene sulfides, polyphenylene oxides, polyether ether ketones, polyolefins, e.g., polyethylene and polypropylene, polycarbonates, polyurethanes, polysiloxanes, polymethacrylates, polyacrylates, polyarylates, polyvinyls, polyethers, and fluoropolymers. Thermoplastic polymers such as polyolefins are preferred. The resultant articles, due to the presence of the fluorochemical oligomer, have improved hydrophilicity.

The preferred polyolefins used to produce the non-woven web or microporous film of the present invention is a poly(alpha)olefin consisting of repeating units derived from mono-1-olefins (alpha olefins) having 2 to 4 carbon atoms. The monomers that can be employed to produce the thermoplastic olefinic polymer for use in this invention include ethylene, propylene and 1-butene, alone, or in admixture, or in sequential polymerization systems. Examples of suitable thermoplastic polymers include polyethylene, the presently preferred polypropylene, propylene/ethylene copolymers, polybutylene and blends thereof, such as polypropylene/polybutylene blends. Processes for preparing these polymers are well known, and the invention is not limited to a polymer made with a particular catalyst or process.

The compositions of this invention, which comprise a three-component blend of first polymer, second polymer and surface-modifying additive, have enhanced surface-modification, for example, increased water repellency or hydrophilicity, compared to two-component blends of thermoplastic polymer and surface-modifying additive, or two-component blends of first and second polymer.

Polymers useful as the second polymer of this invention are those polymers (or blends of polymers) that reduce the crystallinity of the first polymer. Generally, a second polymer will not decrease the crystallinity of the first polymer if it is incompatible with the first polymer.

When the first polymer is a polypropylene homopolymer, for example Escarene™ PP3505 from Exxon, a copolymer, or mixtures thereof, the second polymers useful in this invention include resins such as polybutylene and copolymers thereof such as, for example, polybutylene PB 0200, polybutylene PB 0400, polybutylene PB 0800, polybutylene DP 8310, and polybutylene DP 8340 (all available from Basell, Wilmington, Del.); and atactic poly(alpha)olefins, such as APAO-2180 E8 atactic polypropylene (high MW homopolymer of polypropylene, available from Rexene Co.).

The second polymer, such as polybutylene PB 0400, generally is effective at levels of about 2 to 5 wt. %, with a preferred level of at least about 5wt. %. The enhancement effect is seen at additive levels of up to 25 wt. % and higher.

Useful thermoset resins include, for example, polyurethanes, alkyd resins, phenolic resins, amino resins (for example, melamine and urea resins), epoxy resins, unsaturated polyesters (including so-called vinyl esters), allylics (for example, polymers derived from allyldiglycolcarbonate), fluoroelastomers, polyacrylates, and polyacrylates; and the like and blends thereof. Preferred thermoset polymers include polyurethanes, epoxy resins, fluoroelastomers, polyacrylates, polymethacrylates, unsaturated polyesters, and blends thereof.

When using thermoset resins, such as epoxy resins, urethanes and acrylates, the alkylated fluorochemical additive may be mixed with the resin and cured by application of heat. Preferably such thermoset resins may be processed by reactive extrusion techniques such as are taught in U.S. Pat. No. 4,619,976 (Kotnour) and U.S. Pat. No. 4,843,134 (Kotnour) the disclosures of which are herein incorporated by reference.

The present invention provides a synthetic organic polymer composition comprising a thermoplastic or thermoset organic polymer and one or more of the fluorinated additives of Formulas I dispersed therein. The additives are useful as polymer melt additives to impart desirable hydrophilic properties to the thermoplastic or thermoset polymer.

Shaped articles (e.g., fibers, films and molded or extruded articles) of this invention can be made, e.g., by blending or otherwise uniformly mixing the additive and the polymer, for example by intimately mixing the additive with pelletized or powdered polymer, and melt extruding the mixture into shaped articles such as pellets, fibers, or films by known methods. The additive can be mixed per se with the polymer or can be mixed with the polymer in the form of a "masterbatch" (concentrate) of the additive in the polymer. Masterbatches typically contain from about 5% to about 30% by weight of the fluorochemical additive. Also, an organic solution of the additive may be mixed with the powdered or pelletized polymer, the mixture dried to remove solvent, then melted and extruded into the desired shaped article. Alternatively, molten additive (as a compound(s) or masterbatch) can be injected into a molten polymer stream to form a blend just prior to extrusion into the desired shaped article.

The amount of hydrophilic fluorochemical additive in the composition is that amount sufficient to produce a shaped article having a surface with the desired hydrophilicity. Preferably, the amount of additive will be that amount which provides from about 200 to 10,000 ppm fluorine, more preferably 1000 to 3000 ppm, based on the weight of the shaped article.

The hydrophilic fluorochemical additive is typically added to the melt of the olefinic polymer prior to extrusion and is typically added in an amount of at least 0.1% by weight based on the weight of the composition (thermoplastic polymer plus additive), and more preferably in an amount of at least 0.5% by weight. The maximum amount of the hydrophilic fluorochemical additive is not critical; however, it is preferred not to use excessive amounts so as to not impair the mechanical properties of the microporous film or the fibers of the non-woven web. Generally, the amount of hydrophilic fluorochemical additive is between 0.1% by weight and 5% by weight, more preferably between 0.5% by weight and 1.5% by weight based on the weight of the composition. The amount of additive needed to impart hydrophilicity to thermoplastic olefins differs depending on the polyolefin and its molecular weight. For instance, lower amounts of additive are generally needed to impart hydrophilicity to polyethylene compared to polypropylene, and lower molecular weight polymers require less additive to impart hydrophilicity than higher molecular weight polymers.

When nonwoven webs or microporous films are prepared containing less than 2.0 weight percent of the hydrophilic fluorochemical additive the hydrophilic fluorochemical additive is conveniently incorporated into the polymer by tumble blending or mechanically mixing the hydrophilic fluorochemical additive with polymer pellets or powder prior to extrusion or by metering liquid non-ionic fluorochemical additive or blend into the extruder hopper along with the polymer pellets during extrusion. When greater than about 2.0 weight percent of hydrophilic fluorochemical additive is used, it is preferable to inject the hydrophilic fluorochemical additive into the molten polymer stream under high pressure either in the extruder barrel or immediately as the melt stream exits the extruder and before it enters the extrusion die. For convenience, a "masterbatch" or superconcentrate of hydrophilic fluorochemical additive in thermoplastic olefinic polymer can be made (e.g., thermoplastic olefinic polymer containing 5–30 weight percent of hydrophilic fluorochemical additive which was melted and extruded into pellets) and added to the remaining thermoplastic olefinic polymer before the extrusion process.

Because melt extrusions can be conducted at high temperatures, some above 300° C., it is advantageous for the additive to have as great a thermal stability as possible. The durable hydrophilicity is often achieved without requiring post fiber-spinning operations, e.g. heating, because the fiber is durably hydrophilic as extruded.

After melt extrusion of a fiber, film or extruded article, an annealing step may be carried out to enhance migration of the additive. Annealing apparently allows the hydrophilic fluorochemical additive to migrate to the surface of the thermoplastic polymer with a resultant increase in hydrophilicity. The fiber or film is annealed at a temperature and for a time sufficient to increase the amount of hydrophilic fluorochemical additive at the surface. Effective time and temperature will bear an inverse relationship to one another and a wide variety of conditions will be suitable. Using polypropylene, for example, the annealing process can be conducted below the melt temperature at about 50° to 120° C. for a period of about 30 seconds to 10 minutes. Annealing may also be effected by contact with heated rolls, such as embossing rolls, at 50° C. to 160° C. for periods of about 1 to 30 seconds. In some cases, the presence of moisture during annealing, e.g., by using an autoclave to anneal, can improve the effectiveness of the hydrophilic fluorochemical additive. The annealing method may also serve to reduce the amount of hydrophilic fluorochemical additive necessary by maximizing fluorine content at the surface of the polymer.

In addition to their use in modifying the properties of fibers, the polymer composition of the invention is also useful in preparing blown microfibers for non-woven fabrics having absorbent properties. When the fluorochemical compounds of the invention are used as additives in melt blown microfibers, the additive is preferably present in amounts of about 0.1 to 5 weight percent, more preferably from 0.5 to 1.5 weight percent.

As used herein, the terms "fiber" and "fibrous" refer to particulate matter, generally thermoplastic resin, wherein the length to diameter ratio of the particulate matter is greater than or equal to about 10. Fiber diameters may range from about 0.5 micron up to at least 1,000 microns. Each fiber may have a variety of cross-sectional geometries, may be solid or hollow, and may be colored by, e.g., incorporating dye or pigment into the polymer melt prior to extrusion.

The non-woven webs of fibers of thermoplastic olefinic polymer for use in this invention include non-woven webs manufactured by any of the commonly known processes for producing non-woven webs. For example, the fibrous non-woven web can be made by spunbonding techniques or melt-blowing techniques or combinations of the two. Spun-bonded fibers are typically small diameter fibers that are formed by extruding molten thermoplastic polymer as filaments from a plurality of fine, usually circular capillaries of a spinneret with the diameter of the extruded fibers being rapidly reduced. Meltblown fibers are typically formed by extruding the molten thermoplastic material through a plurality of fine, usually circular, die capillaries as molten threads or filaments into a high velocity, usually heated gas (e.g. air) stream which attenuates the filaments of molten thermoplastic material to reduce their diameter. Thereafter, the meltblown fibers are carried by the high velocity gas stream and are deposited on a collecting surface to form a web of randomly disbursed meltblown fibers. Any of the non-woven webs may be made from a single type of fiber or two or more fibers which differ in the type of thermoplastic olefinic polymer and/or thickness. Alternatively, sheath-core fibers can be extruded, containing different polymer compositions in each layer or containing the same polymer composition in each layer but employing the more expensive fluorochemical component in the outer sheath layer.

The melt blown polypropylene microfibers useful in the present invention can be prepared as described in Van Wente, A., "Superfine Thermoplastic Fibers," Industrial Engineering Chemistry, vol. 48, pp. 1342–1346 (1956) and in Report No. 4364 of the Naval Research Laboratories, published May 25, 1954, entitled "Manufacture of Super Fine Organic Fibers" by Van Wente et al. or from microfiber webs containing particulate matter such as those disclosed, for example, in U.S. Pat. No. 3,971,373 (Braun), U.S. Pat. No. 4,100,324 (Anderson) and U.S. Pat. No. 4,429,001 (Kolpin et al.), which patents are incorporated herein by reference. Multilayer constructions of nonwoven fabrics enjoy wide industrial and commercial utility and include uses such as fabrics for medical gowns and drapes. The nature of the constituent layers of such multilayer constructions can be varied according to the desired end use characteristics, and can comprise two or more layers of melt-blown and spun-bond webs in many useful combinations such as described in U.S. Pat. Nos. 5,145,727 and 5,149,576, both descriptions of which are incorporated herein by reference.

Any of a wide variety of constructions, especially multi-layer constructions such as SMS (spunbond/meltblown/spunbond) constructions, may be made from the above-described fibers and fabrics, and such constructions will find utility in any application where some level of hydrophilicity is required. The fibers prepared from the synthetic organic polymer composition of the invention may be used in woven and nonwoven medical fabrics (such as drapes, gowns and masks), industrial apparel, outdoor fabrics (such as umbrellas, awning, tents, etc), raincoats and other outdoor apparel, as well as home furnishings such as table linens and shower curtains, and in myriad other related uses.

The fiber and fabrics of this invention can be used to prepare absorbent articles such as medical or surgical drapes, diapers, feminine care products, and adult incontinence products, which utilize the fiber and fabrics as at least a portion of their fluid-absorbing "core" element. "Absorbent article" as used herein refers to a consumer product that is capable of absorbing significant quantities of water and other aqueous fluids (i.e., liquids) such as body fluids. Examples of aqueous media absorbent articles include disposable diapers, sanitary napkins, tampons, incontinence pads, disposable training pants, paper towels, geofabrics, facial tissues, medical drapes, medical gowns, and the like. The fabrics of the present invention are particularly suitable for use in articles like medical and surgical drapes.

Absorbent articles frequently will comprise a substantially aqueous media impervious backing sheet, an aqueous media permeable top sheet and an aqueous absorbent core comprising an aqueous media absorbent structure positioned between said backing sheet and said top sheet. The impervious backing sheets may comprise any material, such as polyethylene or polypropylene, preferably having a thickness of at least about 0.01 mm, which will help retain fluid within the absorbent article. An impervious backing sheet may also comprise a fabric treated with a water repellent material. The permeable top sheets can comprise material, such as polyester, polyolefin, rayon, and the like, that is substantially porous and permits aqueous media to readily pass therethrough into the underlying absorbent core. Suitable materials for both the top sheets and the backing sheets are well known in the art.

Disposable diapers comprising the hydrophilic fabrics of the invention may be made by using conventional diaper making techniques, replacing or supplementing the wood pulp fiber core typically employed with the hydrophilic fabrics of the present invention. The hydrophilic polymers of the invention may also be used to input hydrophilicity to the top sheet of such an article where hydrophilicity is desired. The hydrophilic fabrics of this invention may thus be used in diapers in single layer or in multiple layer core configurations. Articles in the form of disposable diapers are described by U.S. Pat. No. 3,592,194 (Duncan et al.), U.S. Pat. No. 3,489,148 (Duncan et al.), and U.S. Pat. No. 3,860,003 (Buell), whose descriptions are also incorporated herein by reference.

The hydrophilic fluorochemical additive may be added to thermoplastic resin and the resin processed to create a durably hydrophilic film in accordance with conventional processing techniques. Such films may be non-porous or porous (including films that are mechanically perforated) selected according to desired performance characteristics. The resulting hydrophilic films find utility, for example, in the construction of medical or personal care articles, and battery separators among other uses.

The compositions of the invention are particularly suitable in the preparation of nonwoven medical fabrics, comprising at least one hydrophilic nonwoven fabric layer (comprising the composition of the invention) bonded, adhered or otherwise affixed to a film layer. Preferably said nonwoven fabric layer may comprise a spunbonded layer, and said film layer comprises a liquid impervious, breathable film layer. In certain embodiments, the medical fabric may further comprise a layer of pressure sensitive adhesives for affixing the medical fabric, such as a surgical drape, to a patient. Such a construction would be in the form of nonwoven fabric layer/film layer/adhesive layer.

Desirably, the surgical drapes of the present invention are formed from one or more nonwoven fabric layers. In the case of multiple layers, the layers are generally positioned in a juxtaposed or surface-to-surface relationship and all or a portion of the layers may be bound to adjacent layers. The nonwoven fabric may also be formed from a plurality of separate nonwoven webs wherein the separate nonwoven webs are similar or different from one another.

As used herein, the term "nonwoven fabric" refers to a fabric that has a structure of individual fibers or filaments which are randomly and/or unidirectionally interlaid in a mat-like fashion. Nonwoven fabrics can be made from a variety of processes including, but not limited to, air-laid processes, wet-laid processes, hydroentangling processes, staple fiber carding and bonding, and solution spinning. Suitable nonwoven fabrics include, but are not limited to, spunbonded fabrics, meltblown fabrics, wet-laid fabrics, hydroentangled fabrics, spunlaced fabrics and combinations thereof.

The surgical drapes of the present invention comprise at least one hydrophilic nonwoven fabric and a film attached to the nonwoven fabric. Desirably, the surgical drapes comprise a hydrophilic spunbonded fabric. More desirably, the surgical drapes comprise a hydrophilic spunbonded fabric and a breathable film attached to the spunbonded fabric.

As used herein, the term "breathable" refers to a material that allows the passage of vapor and/or gas therethrough, but forms a barrier against the passage therethrough of liquids. Breathable films are well known in the art and may be produced by any known method.

In a further embodiment, the surgical drape of the present invention includes a hydrophilic nonwoven fabric or laminate, as described above, and a layer in the form of a liquid-impervious film. The film layer provides liquid strike-through protection to the surgical drape and may also provide properties such as breathability and particulate filtration. The film is desirably formed from a material that is liquid impermeable and vapor permeable. Desirably, the film has a film thickness of from about 0.3 to about 1 mil (7.6 to 25.4 micrometers). More desirably, the film has a film thickness of from about 0.5 to about 0.8 mil (12.7 to 20.3 micrometers).

Examples of films that are useful include polyurethanes, such as ESTANE polyurethanes (available from B.F. Goodrich, Cleveland, Ohio), elastomeric polyester such as HYTREL™ polyester elastomer (E. I. duPont deNemours & Co., Wilmington, Del.), blends of polyurethane and polyester, polyvinyl chloride, and polyether-amide block copolymer, such as PEBAX available from Elf-Atochem. Particularly preferred films for use in the present invention are polyurethane and elastomeric polyester films. The polyurethane and elastomeric polyester films exhibit a resilient property that allows the films to have good conformability.

Particularly useful films include so-called "spyrosorbent" films having a differential moisture vapor transmission rate (MVTR). Medical articles incorporating spyrosorbent films have the ability to adjust the moisture vapor transmission properties in response to the amount of fluid. Such spyrosorbent films are hydrophilic, moisture vapor permeable and have a relatively high MVTR (wet), and have a differential MVTR ratio (wet to dry) that is greater than 1, and preferably greater than 3:1. The dry MVTR is greater than about 2,600 $g/m^2/24$ hrs, preferably about 3000 to 4000 $g/m^2/24$ hrs. A particularly preferred spyrosorbent film, useful as a backing layer, is a segmented polyurethane such as a segmented polyether polyurethane urea based on polytetramethylene glycol and polyethylene glycol polyols. Such spyrosorbent films are described in U.S. Pat. Nos. 5,653,699 and 4,849,458 (Reed et al.).

The film may also contain filler material in order to impart desirable properties to the film such as increased vapor permeability. The amount of filler material may vary widely as long as the liquid impermeability of the film is maintained. One preferred breathable film comprises a polymeric blend of polypropylene and Catalloy™ polymer filled with about 60 wt % calcium carbonate.

The film may be adhesively attached to the hydrophilic nonwoven layer using any known adhesive that ensures that the layers remain attached during use. Alternatively, when the film and nonwoven fabric contain components that are thermally miscible with and adherent upon thermal activation, the film may be thermally bonded to the hydrophilic nonwoven fabric by heating the film, fabric, or film and fabric to a sufficient temperature and applying sufficient pressure to form unitary, cohesive bonds among the components of the film, fabric, or film and fabric. Moreover, the film may be extrusion coated onto the hydrophilic nonwoven fabric.

The surgical drapes of the present invention, formed from at least one layer of hydrophilic nonwoven fabric, may also be provided with one or more openings, apertures or fenestrations within the surgical drape. The fenestration is generally sized for overlying the operating site of the patient and for providing a health care provider a means of accessing the site. The fenestration may extend through one or more of the surgical drape layers and may vary in size depending upon the intended use of the surgical drape. Additionally, the surgical drape may contain other components such as an incise material, a release layer over an incise material, a pouch for storing surgical equipment, etc.

The articles provided by the present invention include surgical gowns, drapes, masks, gloves, sterile wraps, wound dressings and waste disposal bags, and descriptions of such articles are found, for example, in U.S. Pat. No. 3,856,005 (Sislian); U.S. Pat. No. 4,976,274 (Hanssen); U.S. Pat. No. 4,845,779 (Wheeler et al.); U.S. Pat. No. 3,911,499 (Benevento et al.); U.S. Pat. No. 4,920,960 (Hubbard et al.); U.S. Pat. No. 4,419,993 (Petersen); U.S. Pat. No. 3,426,754 (Bierenbaum et al.); U.S. Pat. No. 4,515,841 (Dyke); UK Application No. 2,232,905A (Woodcock).

EXAMPLES

Glossary

| Designator | Formula, description and/or chemical name | Availability |
| --- | --- | --- |
| SA-1 | 2,6,8-trimethyl-4-nonyloxy-10-polyethyleneoxyethanol; "TERGITOL TMN-10" | Union Carbide, Danbury, CT |
| SA-2 | C8 and C10 alcohol linear alcohol 10 ethoxylate $HO(CH_2CH_2O)_{10}C_{8,10}H_{17,21}$ (of wider ethyleneoxide distribution); "ALFONIC 810-10" | SASOL North America, Austin, TX |
| SA-3 | 4-Octylphenol-10-ethoxylate; "TRITON X-100" | Union Carbide |
| SA-4 | 4-butyloctanol-10-ethoxylate; "NOVEL II ISOFOL I12-10" | SASOL |
| SA-5 | Tridecyl alcohol 9.5-ethoxylate; "NOVEL II TDA-9.5" | SASOL |
| SA-6 | C12, C14 and C16 linear alcohol 9.5 ethoxylate; "GENAPOL 26L-80" | Clariant Corp., Charlotte, NC |
| SA-7 | C8 and C10 alcohol linear alcohol 10 ethoxylate $HO(CH_2CH_2O)_{10}C_{8,10}H_{17,21}$ (of narrower ethyleneoxide distribution); "NOVEL II ALFONIC 810-10" | SASOL |
| SA-8 | C12 and C13 alcohols with branches at beta positions of alcohols-10-ethoxylate; "NOVEL II ISALCHEM 123-10" | SASOL |
| SA-9 | C14 and C15 alcohols with branches at beta positions of alcohols-10-ethoxylate; "NOVEL II ISALCHEM 145-10" | SASOL |
| SA-10 | C13 and C14 with branches at gamma positions or later positions of alcohols-10-ethoxylate; "TRYCOL 5943 TDA-12" | Cognis Corp., Mauldin, SC |
| SA-11 | Lauryl ester 10-ethoxylate; "LUMULSE 40-L" | Lambert Technologies Corp., Skokie, IL |
| SA-12 | C10 and C12 alcohol linear alcohol 10 ethoxylate $HO(CH_2CH_2O)_{10}C_{10,12}H_{21,25}$ (of narrower ethyleneoxide distribution); "NOVEL II ALFONIC 1012-10" | SASOL |
| SA-13 | Polyethylene glycol monomethyl ether; about 350 MW; "CARBOWAX 350" | Union Carbide |
| MAPEG 400 | PEG (400) Monotallate; "MAPEG 400 MOT" | BASF, Mount Olive, NJ |
| MeFBSA | N-methyl perfluorobutanesulfonamide; $C_4F_9SO_2NH(CH_3)$ | Prepared as described in U.S. Pat. No. 6,664,354; Example 1, Part A. |
| MeFOSA | N-methyl perfluorooctanesulfonamide; $C_8F_{17}SO_2NH(CH_3)$ | May be prepared according to U.S. Pat. No. 2,803,656 (Ahlbrecht), Example 1, substituting an equimolar amount of N-methylamine for N-propylamine |
| TC | $SOCl_2$; thionyl chloride | Sigma Aldrich; Milwaukee, WI |

Designators SC-1 through SC-13 represent the chloride derivatives of SA-1 through SA-13 respectively.

Designators FSC-1 through FSC-13 represent the fluorochemical surfactant derivatives of SC-1 through SC-13 respectively, with MeFBSA.

Designators CFCS-1, CFCS-2, CFCS-3, CFCS-6, CFCS-12, and CFCS-13 represent the fluorochemical surfactant derivatives of SC-1, SC-2, SC-3, SC-6, SC-12 and SC-13 respectively, with MeFOSA Thermoplastic Polymers PP3505: "ESCORENE PP3505" polypropylene, having a 400 melt index flow rate, available from Exxon Chemical Co., Baytown, Tex.

PB0400: polybutylene, available from Basell, Wilmington, Del.

Test Methods:

Thermal Decomposition Determination

The onset of thermal decomposition of each additive was determined by thermal gravimetric analysis (TGA) under an inert nitrogen atmosphere using a 10° C./minute temperature ramp.

Hydrophilicity Test

The Hydrophilicity Test was conducted using the following procedure. Holding the outside edges, as wound, (thus testing the sample from side-to-side in the cross web direction) a rectangular web sample (approximately 8 inch×10 inch (20 cm×25 cm)) is passed under a stream of cold (approximately 25° C.±2° C.) tap water with a volume output of approximately 200 ml/min at a distance of about 1 inch (2.5 cm) from the water spigot. The nonwoven web sample was held with thumbs downward on top of the center of each 10 inch (25 cm) side edge and fingers upward underneath the web sample pointed toward the center of the sample for support Each nonwoven web sample had a basis weight of 50 g/m$^2$±5 g/m$^2$, an effective fiber diameter of 8 to 13 microns (as calculated according to the method set forth in Davies, C. N., "The Separation of Airborne Dust and Particulates," Institution of Mechanical Engineers, London, Proceedings 1B, 1952), and a web solidity of 5 to 15%.

The following number scale was used to rate the hydrophilicity of each web sample:

1 immediate wetting (web sample goes from being completely opaque to completely translucent);

2 wetting delayed for about 0.5 to 2.0 seconds (web sample goes from being completely opaque to completely translucent);

3 wetting delayed from greater than 2.0 seconds to about 10 seconds (web sample goes from being completely opaque to completely translucent);

4 wetting delayed from greater than 2.0 seconds to about 10 seconds, but wetting occurs only where the web sample contacts the hand placed under the sample;

5 no wetting at all (i.e., the web sample remains opaque).

Where the degree of wetting varied across the width of the web sample, a set of three numerical values was recorded, representing values measured in a direction perpendicular to the machine direction from one side of the web sample to the other. For example, in one case, the first 40% of the distance across the web sample showed a reading of "1", the next 20% of the distance across the web sample showed a reading of "5", and the final 40% of the distance across the web sample showed a reading of "2". The reported rating for this web would be the weighted average of the values or (0.40) (1)+(0.20)(5)+(0.40)(2)=2.2. A value (either single or weighted average) of no greater than 3 is preferred.

Melt-Blown Extrusion Procedure

The melt-blown extrusion procedure is the same as described in U.S. Pat. No. 5,300,357, column 10, which is herein incorporated by reference. The extruder used is a Brabender 42 mm conical twin screw extruder, with optimized extrusion temperatures for a given EFD, and distance to the collector of 12 inches (30 cm). The thermoplastic polymer is placed in a suitable container. The additive is weighed out and then combined with the thermoplastic polymer by using a hand held drill fitted with an impeller mixer. The process condition for each mixture is the same, including the melt blowing die construction used to blow the microfiber web, the basis weight of the web (50+/−5.0 g/m$^2$) and the diameter of the microfibers (5–18 micrometers). Unless otherwise stated, the primary air temperature is in the range of 235–250° C. (to achieve the desired EFD), the pressure is 124 kPa (18 psi; 0.076 cm air gap width) and the polymer throughput rate is about 180 g/hr/cm.

Preparation of FCS-1

A 2 liter round bottom three necked flask equipped with magnetic stirbar and silicone oil bath was charged with SA-1 (856.9 g @ 90% solids) and heated at 120° C. and 25 mm Hg (3.38 kPa) vacuum to provide 779.4 g of 100% solids material. Approximately 30 g aliquot of the dried material was withdrawn and the remainder of the material was left in the flask (747.4 g; 1.13 mole). The flask was fitted with a reflux condenser, an additional funnel and a sodium hydroxide scrubber consisting of two 1 L flasks connected in series; the second scrubber contained about 500 ml of a 20% sodium hydroxide solution into which was placed a bubbler tube. The flask was heated to 65° C. and TC (156.22 g, 1.313 mole) was added from the addition funnel over about 1 h. After addition of TC, the mixture temperature was about 55° C. The temperature of the heating bath was raised to 75° C. for about 30 min, then to 95° C. The addition funnel was replaced with a glass tube extending below the surface of the mixture (delivering nitrogen gas at about 10 bubbles/sec), and the mixture was allowed to stir overnight (about 20 h, at 95° C., continuing nitrogen bubbling). The mixture was then stripped of any volatiles by heating at 140° C. for 2 h @ 25 mm of Hg (3.38 kPa) vacuum. The reaction yielded intermediate SC-1 (767.6 g; 99.27% yield). The $^1$H and $^{13}$C NMR spectra were consistent with the structure of the desired intermediate.

A 3-L three-necked round bottom flask equipped with a mechanical stirrer, silicone oil bath and reflux condenser was charged with SC-1 (691.0 g; 1.016 mol). The system was purged with nitrogen, and MeFBSA (322.5 g; 1.030 mol) was added to the flask. The mixture was heated to 120° C. with stirring, and Na$_2$CO$_3$ (131.0 g; 1.236 mol; powdered, available from Sigma Aldrich) was slowly added in small portions to avoid excessive foaming. Next KI (potassium iodide; 10.7 g; 0.065 mol; available from Sigma Aldrich) was added, and the ensuing mixture was heated at 120° C. with stirring. After 18 h, two 1.0 g aliquots were withdrawn from the reaction mixture and diluted with 2-butanone (1.5 g; available from Sigma Aldrich). Analysis of the first sample by GLC indicated complete consumption of MeFBSA. The second sample was filtered through "CELITE" (available from Sigma Aldrich), the filtrate was concentrated under reduced pressure yielding a clear orange oil, and analysis by $^{13}$C NMR confirmed the absence of the starting chloride.

The temperature of the reaction mixture was reduced to 95° C., and 800 mL of hot (55° C.) tap water was added. The mixture was transferred to a 2-L separatory funnel, the lower aqueous layer was separated, and the product was washed with three additional 500 mL portions of hot tap water. The organic phase was washed with one 800 ML portion of 50% aqueous NaCl, and the pH of the aqueous phase was adjusted to approximately 7 with 10% aqueous $H_2SO_4$. The layers were separated, and the organic layer was transferred to a 1-L distillation flask. Water and other volatiles were distilled from the product at a pressure of $\leq 0.5$ Torr ($\leq 6.6 \times 10^{-5}$ Mpa) by gradually raising the silicone oil bath temperature to 140° C. There remained 973.3 g of an amber liquid suspending a small amount of insoluble material. Solids were permitted to settle from the product, and the clear amber supernatant was recovered by decantation. The $^1$H and $^{13}$C NMR spectra of the amber liquid were consistent with the structure of FCS-1.

Alternate Preparation of FCS-1; AFCS-1

A 3 liter three-necked round bottom flask equipped with a mechanical stirrer, silicone oil bath and reflux condenser was charged with SC-1 (206.4 g; 0.303 mol) and MeFBSA (93.9 g; 0.300 mol). The system was purged with nitrogen, the mixture was heated to 120° C. with stirring, and $Na_2CO_3$ (38.2 g; 0.360 mol) and KI (7.5 g; 0.045 mol) were added. After 2 h at 120° C., the temperature of the mixture was increased to 140° C., and the mixture was heated with stirring at this temperature for an additional 2 h. The temperature of the mixture was reduced to 95° C., 149.5 g of hot (55° C.) tap water was added, and the mixture was stirred for 15 min at 95° C. The mixture was transferred to a separatory funnel, and the aqueous layer was separated and discarded. The product phase was returned to the reaction flask, 150.0 g of 1% aqueous $H_2SO_4$ was added, and this mixture was stirred for 15 min at 95° C. The mixture was transferred to a separatory funnel, the aqueous layer was separated and discarded, and the product phase was transferred into a 1 liter distillation flask. A stillhead was attached, and water and other volatiles were distilled from the product at a pressure of 76.2 mm of Hg (10.1 kPa) and a bath temperature of 145° C. over a period of 1 h. There remained 276.9 g of a nearly clear amber liquid.. The $^1$H and $^{13}$C NMR spectra of the amber liquid were consistent with the structure of FCS-1.

Preparation of FCS-2 through FCS-13

The procedure outlined for Preparation of FCS-1 was followed for Preparations FCS-2 through FCS-13 with the exception that the amounts of the appropriate SA and thionyl chloride were adjusted according to values listed in Table 1 to prepare the corresponding SC chloride derivatives and the amounts of other reagents were adjusted as specified in Table 2 for Preparation of FCS-2 through FCS-13.

Preparation of CFCS-1, CFCS-3, CFCS-6, CFCS-12 and CFCS-13 for use in comparative examples.

The procedure outlined for Preparation of FCS-1 was followed for Preparation of CFCS-1, CFCS-2, CFCS-3, CFCS-6, CFCS-12 and CFCS-13 with the exception that the amounts of the indicated reagents were adjusted according the values given in Tables 3.

TABLE 1

| Preparation of SC | SA used (g; mole) | Thionyl Chloride g (mole) |
|---|---|---|
| SC-2 | SA-2 (771.2; 1.33) | 189.82 (1.59) |
| SC-3 | SA-3 (910.0; 1.41) | 201.1 (1.69) |
| SC-4 | SA-4 (803.0; 1.27) | 173.83 (1.46) |
| SC-5 | SA-5 (907.4; 1.45) | 206.61 (1.74) |
| SC-6 | SA-6 (200.2; 0.377) | 48.1 (0.41) |
| SC-7 | SA-7 (871.2; 1.5) | 214.2 (1.80) |
| SC-8 | SA-8 (703.8; 1.11) | 158.73 (1.33) |
| SC-9 | SA-9 (733.2; 1.11) | 158.38 (1.33) |
| SC-10 | SA-10 (802.1; 1.01) | 144.51 (1.22) |
| SC-11 | SA-11 (734.7; 1.20) | 172.0 (1.45) |
| SC-12 | SA-12 (912.8; 1.48) | 211.61 (1.78) |
| SC-13 | SA-13 (7,000.0; 20.0) | 2,489.0 (21.0) |

TABLE 2

| Preparation of FCS | SC used (g; mole) | MeFBSA g (mole) | $Na_2CO_3$ g (mole) | KI g (mole) | Final Yield of FCS (g) |
|---|---|---|---|---|---|
| FCS-2 | SC-2 (113.7; 0.200) | 62.6 (0.200) | 25.4 (0.240) | 2.1 (0.0125) | 139.0 |
| FCS-3 | SC-3 (1750.0; 2.687) | 841.5 (2.687) | 341.8 (3.224) | 28.1 (0.169) | 2235.8 |
| FCS-4 | SC-4 (98.6; 0.150) | 47.0 (0.150) | 19.1 (0.180) | 1.6 (0.009) | 122.2 |
| FCS-5 | SC-5 (193.7; 0.300) | 93.9 (0.300) | 38.2 (0.360) | 3.1 (0.019) | 257.0 |
| FCS-6 | SC-6 (72.36; 0.109) | 33.41 (0.1067) | 117.6 (1.110) | 3.1 (0.019) | 95.45 |
| FCS-7 | SC-7 (554.2; 0.925) | 289.7 (0.925) | 117.6 (1.110) | 10.0 (0.060) | 780.0 |
| FCS-8 | SC-8 (467.1; 0.700) | 219.2 (0.700) | 89.0 (0.840) | 7.3 (0.044) | 607.0 |
| FCS-9 | SC-9 (206.9; 0.300) | 93.9 (0.300) | 38.2 (0.360) | 3.1 (0.019) | 270.9 |
| FCS-10 | SC-10 (243.3; 0.300) | 93.9 (0.300) | 38.2 (0.360) | 3.1 (0.019) | 315.1 |
| FCS-11 | SC-11 (688.5; 1.000) | 313.1 (1.000) | 127.2 (1.200) | 10.4 (0.063) | 875.0 |
| FCS-12 | SC-12 (190.3; 0.300) | 93.9 (0.300) | 38.2 (0.360) | 3.1 (0.019) | 256.1 |
| FCS-13 | SC-13 (32.49; 0.088) | 26.3 (0.084) | 10.88 (0.10) | 0.87 (0.0053) | 48.8 |

TABLE 3

| Preparation of FCS | SC used (g; mole) | MeFOSA g (mole) | $Na_2CO_3$ g (mole) | KI g (mole) | Final Yield of CFCS (g) |
|---|---|---|---|---|---|
| CFCS-1 | SC-1 (405.5; 0.600) | 307.9 (0.600) | 76.3 (0.720) | 10.0 (0.060) | 663.1 |

TABLE 3-continued

| Preparation of FCS | SC used (g; mole) | MeFOSA g (mole) | Na₂CO₃ g (mole) | KI g (mole) | Final Yield of CFCS (g) |
|---|---|---|---|---|---|
| CFCS-2 | SC-2 (610.47; 1.02) | 513.0 (1.00) | 130.21 (1.20) | 10.45 (0.0625) | 1001.3 |
| CFCS-3 | SC-3 (117.2; 0.180) | 92.4 (0.180) | 22.9 (0.216) | 3.0 (0.018) | 191.2 |
| CFCS-6 | SC-6 (152.54; 0.249) | 125.0 (0.237) | 37.71 (0.355) | 2.46 (0.0141) | 261.62 |
| CFCS-12 | SC-12 (190.3; 0.300) | 154.0 (0.300) | 38.2 (0.360) | 5.0 (0.030) | 317.0 |
| CFCS-13 | SC-13 (32.49; 0.088) | 26.3 (0.084) | 10.88 (0.10) | 0.87 (0.0053) | 48.8 |

EXAMPLES 1–12 AND COMPARATIVE EXAMPLES C-1 TO C-7

Table 4 lists the results of the thermal gravimetric analysis (TGA) for Examples 1 through 12 and Comparative Examples C-1 through C-7 at various temperatures (275° C., 300° C. and 325° C.). A higher percentage remaining indicates improved thermal stability of the additive.

TABLE 4

TGA data for FCS and CFCS derivatives; % remaining at 275° C., 300° C. and 325° C.

| | | % Remaining at given Temperature | | |
|---|---|---|---|---|
| Example | FCS | 275° C. | 300° C. | 325° C. |
| 1 | FCS-1 | 96.4 | 93.1 | 85.3 |
| 2 | FCS-2 | 88.3 | 82.0 | 69.0 |
| 3 | FCS-3 | 98.8 | 97.4 | 94.7 |
| 4 | FCS-4 | 93.2 | 89.2 | 80.5 |
| 5 | FCS-5 | 93.7 | 90.5 | 82.7 |
| 6 | FCS-6 | 92.7 | 87.6 | 77.7 |
| 7 | FCS-7 | 96.4 | 92.6 | 83.7 |
| 8 | FCS-8 | 95.7 | 93.1 | 87.4 |
| 9 | FCS-9 | 96.2 | 94.0 | 89.5 |
| 10 | FCS-10 | 96.0 | 93.9 | 89.4 |
| 11 | FCS-11 | 97.3 | 94.4 | 87.8 |
| 12 | FCS-12 | 98.2 | 96.3 | 91.8 |
| C-1 | FCS-13 | 69.3 | 51.6 | 28.0 |
| C-2 | CFCS-1 | 96.2 | 91.3 | 76.8 |
| C-3 | CFCS-2 | 90.7 | 84.9 | 70.5 |
| C-4 | CFCS-3 | 98.0 | 94.4 | 83.7 |
| C-5 | CFCS-6 | 89.7 | 83.2 | 67.6 |
| C-6 | CFCS-12 | 96.4 | 90.7 | 73.2 |
| C-7 | CFCS-13 | 76.1 | 60.8 | 38.4 |

The data in Table 4 indicate that when comparing Examples of the invention to Comparative Examples with analogous structures, Examples of the invention generally exhibit better thermal stability.

EXAMPLE 13–47 AND COMPARATIVE EXAMPLES C8–C21.

Example 13–Example 47 and Comparative Examples C8–C21 were prepared using the Melt Blown Extrusion Procedure listed above. Table 4 lists the weight percentage of PP3505, weight percentage FCS used, effective fiber diameter (EFD) and Hydrophilicity Test values.

TABLE 5

| Example | PP3505 (%) | CFCS or FCS (%) | EFD | Hydrophilicity Test Score |
|---|---|---|---|---|
| C-8 | 100.00 | N/A | 12.0 | 5 |
| 13 | 99.25 | FCS-1 (0.75) | 14.2 | 4.3 |
| 14 | 99.125 | FCS-1 (0.875) | 12.8 | 2 |
| 15 | 99.00 | FCS-1 (1.00) | 12.8 | 1 |
| 16 | 98.75 | FCS-1 (1.25) | 13.0 | 1 |
| C-9 | 99.125 | CFCS-1 (0.875) | 12.8 | 2 |
| C-10 | 99.00 | CFCS-1 (1.00) | 13.4 | 1.5 |
| C-11 | 98.75 | CFCS-1 (1.25) | 13.0 | 1.5 |
| 17 | 99.25 | FCS-2 (0.75) | 12.3 | 4.7 |
| 18 | 99.125 | FCS-2 (0.875) | 12.2 | 2.5 |
| 19 | 99.00 | FCS-2 (1.00) | 13.8 | 1.5 |
| 20 | 98.75 | FCS-2 (1.25) | 13.3 | 1 |
| C-12 | 99.125 | CFCS-2 (0.875) | 12.8 | 1 |
| C-13 | 99.00 | CFCS-2 (1.00) | 13.6 | 1 |
| C-14 | 98.75 | CFCS-2 (1.25) | 13.6 | 1 |
| 21 | 99.125 | FCS-3 (0.875) | 13.6 | 3 |
| C-15 | 99.125 | CFCS-3 (0.875) | 13.5 | 3 |
| 22 | 99.00 | FCS-3 (1.00) | 13.3 | 2 |
| C-16 | 99.00 | CFCS-3 (1.00) | 13.2 | 2.5 |
| 23 | 98.75 | FCS-3 (1.25) | 13.3 | 2 |
| C-17 | 98.75 | CFCS-3 (1.25) | 14.1 | 2 |
| 24 | 99.25 | FCS-4 (0.75) | 14.9 | 5 |
| 25 | 98.75 | FCS-4 (1.25) | 14.5 | 1 |
| 26 | 99.00 | FCS-5 (1.00) | 14.3 | 4 |
| 27 | 98.75 | FCS-5 (1.25) | 14.2 | 2 |
| 28 | 99.00 | FCS-6 (1.00) | 15.0 | 5 |
| 29 | 98.75 | FCS-6 (1.25) | 14.8 | 2.3 |
| 30 | 99.25 | FCS-7 (0.75) | 13.5 | 3.6 |
| 31 | 99.00 | FCS-7 (1.00) | 12.0 | 1 |
| 32 | 98.75 | FCS-7 (1.25) | 13.0 | 1 |
| 33 | 99.25 | FCS-8 (0.75) | 12.2 | 5 |
| 34 | 99.00 | FCS-8 (1.00) | 12.7 | 3.6 |
| 35 | 98.75 | FCS-8 (1.25) | 13.6 | 1.3 |
| 36 | 99.25 | FCS-9 (0.75) | 12.8 | 5 |
| 37 | 99.00 | FCS-9 (1.00) | 11.9 | 5 |
| 38 | 98.75 | FCS-9 (1.25) | 13.3 | 1.6 |
| 39 | 99.00 | FCS-10 (1.00) | 12.5 | 5 |
| 40 | 98.75 | FCS-10 (1.25) | 13.9 | 4 |
| 41 | 99.25 | FCS-11 (0.75) | 12.8 | 3 |
| 42 | 99.00 | FCS-11 (1.00) | 12.6 | 1 |
| 43 | 98.75 | FCS-11 (1.25) | 11.9 | 1 |
| 44 | 99.25 | FCS-12 (0.75) | 13.2 | 4.9 |
| 45 | 99.125 | FCS-12 (0.875) | 12.5 | 1 |
| C-18 | 99.125 | CFCS-12 (0.875) | 12.3 | 2 |
| 46 | 99.00 | FCS-12 (1.00) | 13.2 | 1.2 |
| C-19 | 99.00 | CFCS-12 (1.00) | 13.5 | 2 |
| 47 | 98.75 | FCS-12 (1.25) | 14.1 | 1 |
| C-20 | 98.75 | CFCS-12 (1.25) | 13.6 | 1 |
| C-21 | 98.75 | CFCS-13 (1.25) | 13.6 | 1 |

The data in Table 5 indicate that when comparing Examples of the invention to Comparative Examples with analogous structures, Examples of the invention generally result in equivalent or improved hydrophilicity.

EXAMPLE 48–EXAMPLE 71

Example 48–Example 71 were prepared using the Melt Blown Extrusion Procedure listed above. Table 6 lists the percent of PP3505, percent PBO400, percent FCS used, effective fiber diameter (EFD) and Hydrophilicity Test scores.

TABLE 6

| Example | PP3505 (%) | PB0400 (%) | FCS (%) | EFD | Hydrophilicity Test Score |
|---|---|---|---|---|---|
| 48 | 91.75 | 7.50 | FCS-1 (0.75) | 12.8 | 1 |
| 49 | 95.50 | 3.75 | FCS-1 (0.75) | 12.2 | 1 |
| 50 | 79.00 | 20.00 | FCS-1 (1.00) | 13.5 | 1 |
| 51 | 79.25 | 20.00 | FCS-1 (0.75) | 12.8 | 1 |
| 52 | 91.75 | 7.5 | FCS-2 (0.75) | 13.1 | 1 |
| 53 | 91.75 | 7.5 | FCS-2 (0.75) | 12.8 | 1.5 |
| 54 | 95.5 | 3.75 | FCS-2 (0.75) | 12.2 | 2 |
| 55 | 91.5 | 7.5 | FCS-3 (1.00) | 15.1 | 1 |
| 56 | 91.75 | 7.5 | FCS-3 (0.75) | 13.2 | 2 |
| 57 | 95.5 | 3.75 | FCS-3 (0.75) | 12.0 | 3.6 |
| 58 | 79.00 | 20.00 | FCS-3 (1.00) | 13.4 | 1.5 |
| 59 | 79.25 | 20.00 | FCS-3 (0.75) | 14 | 2 |
| 60 | 91.75 | 7.5 | FCS-4 (0.75) | 14.5 | 5 |
| 61 | 91.5 | 7.5 | FCS-4 (1.00) | 14.5 | 1 |
| 62 | 91.5 | 7.5 | FCS-5 (1.00) | 14.0 | 1 |
| 63 | 91.5 | 7.5 | FCS-6 (1.00) | 14.6 | 1 |
| 64 | 91.75 | 7.5 | FCS-7 (0.75) | 12.7 | 1 |
| 65 | 95.5 | 3.75 | FCS-7 (0.75) | 12.4 | 1 |
| 66 | 91.75 | 7.5 | FCS-8 (0.75) | 12.6 | 2 |
| 67 | 95.5 | 3.75 | FCS-8 (0.75) | 12.5 | 5 |
| 68 | 91.75 | 7.5 | FCS-9 (0.75) | 12.4 | 2 |
| 69 | 95.5 | 3.75 | FCS-11 (0.75) | 11.5 | 1 |
| 70 | 91.75 | 7.5 | FCS-11 (0.75) | 13.1 | 1 |
| 71 | 91.75 | 7.5 | FCS-12 (0.75) | 12.2 | 1 |

The data in Table 6 show that the inclusion of a secondary polymer such as PBO400 generally enhances the hydrophilicity of nonwoven webs containing additives of the invention.

What is claimed is:
1. A hydrophilic polymer composition comprising
a) a thermoplastic or thermoset polymer, and
b) a hydrophilic fluorochemical additive of the formula:

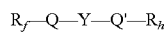

wherein
$R_f$ is a $C_3$ to $C_5$ fluoroalkyl group
Q is a divalent linking group;
Q' is selected from a covalent bond, $—(C_mH_{2m})C(O)O—$, where m=1 to 3, and $—C(O)—$;
Y is a hydrophilic poly(oxyalkylene) moiety having from 8 to 15 repeat units; and
$R_h$ is a $C_8$–$C_{15}$ alkyl group, an aryl group or combination thereof.

2. The composition of claim 1 comprising 0.1 to 5 weight % of said fluorochemical relative to said composition.

3. The composition of claim 1, wherein said poly(oxyalkylene) moiety comprises a poly(oxyethylene) moiety.

4. The composition of claim 1 wherein $R_f$ is a perfluoroalkyl group.

5. The composition of claim 1 wherein Q comprises $—C_nH_{2n}—$, where n is 1 to 6, $—C_nH_{2n-1}X—$, where n is 1 to 6 and X is halogen or $—OH$; $—S—$, $—O—$, $—CO—$, $—SO_2—$, $—N(R)—$, or $—SO_2N(R)—$, where R is a hydrogen or a $C_1$ to $C_6$ substituted or unsubstituted alkyl group; or combinations thereof.

6. The composition of claim 5 wherein Q is selected from the group consisting of $—SO_2N(R)—$, $—CON(R)—$, $—CH_2CH_2SO_2N(R)—$, $SO_2N(R)C_nH_{2n}O[CH_2CH(CH_2Cl)O]_gCH_2CH(CH_2Cl)O—$ (n=1 to 6; g=1 to 10), $—SO_2N(R)C_2H_4OCH_2CH(OH)CH_2O—$, $—SO_2N(R)C_2H_4OCH_2CH(OH)CH_2O—$, $—SO_2N(R)CH_2CH(OH)CH_2NHCH(CH_3)CH_2O—$, $—SO_2N(R)CH_2CH(OH)CH_2O—$, $—(CH_2)_2S(CH_2)_2O—$, and $—(CH_2)_4SCH(CH_3)CH_2O—$, where R is a hydrogen or a $C_1$ to $C_6$ substituted or unsubstituted alkyl group.

7. The composition of claim 6 wherein Q is selected from the group consisting of $—SO_2N(R)—$, and $—SO_2N(R)CH_2CH(OH)CH_2O—$, where R is R is a hydrogen or a $C_1$ to $C_6$ alkyl group.

8. The composition of claim 1 wherein $R_h$ is a $C_8$–$C_{15}$ branched alkyl group.

9. The composition of claim 1 wherein said thermoplastic polymer comprises a polyolefin polymer or copolymer.

10. The composition of claim 9 wherein said polyolefin comprises a propylene polymer or copolymer.

11. The composition of claim 1 wherein said thermoplastic polymer comprises a polypropylene/polybutylene blend.

12. The composition of claim 1 comprising (a) a major amount of at least one semi-crystalline thermoplastic first polymer, said first polymer being polypropylene; (b) an amount of said fluorochemical additive sufficient to modify surface properties of articles made of said composition; and (c) a minor amount of at least one second thermoplastic polymer sufficient to increase said modification of surface properties compared to such composition without said second polymer.

13. The composition of claim 12 wherein said second polymer being selected from the group consisting of polybutylene and copolymers of butylene and ethylene; wherein said additive is present in an amount of about 0.1 to about 2.0 weight percent and said second polymer is present in an amount of about 2 to about 25 weight percent, said weight percentages being based upon the total weight of all components.

14. The composition of claim 1, wherein said thermoset polymer is selected from, polyurethanes, alkyd resins, phenolic resins, amino resins, epoxy resins, unsaturated polyesters, allylics, fluoroelastomers, polymethacrylates and polyacrylates.

15. The composition of claim 1 comprising 0.5 to 1.5 weight % of said fluorochemical relative to said composition.

16. A shaped article comprising the composition of claim 1.

17. The shaped article of claim 16 in the form of a fiber, film or fabric.

18. A medical article comprising a nonwoven fibrous layer comprising the fibers of claim 17.

19. The medical article of claim 18 further comprising at least one additional layer selected from film layers, woven layers and nonwoven layers.

20. The medical article of claim 19 further comprising a pressure sensitive adhesive layer disposed on said film layer.

21. The medical article of claim 19 wherein said film layer is a liquid impermeable and vapor permeable film layer.

22. A method of preparing a hydrophilic shaped article comprising:
a) blending thermoplastic or thermoset polymer with a hydrophilic fluorochemical additive of the formula:

$$R_f\text{—}Q\text{—}Y\text{—}Q'\text{—}R_h$$

wherein
$R_f$ is a $C_3$ to $C_5$ fluoroalkyl group
Q is a divalent linking group;
Q' is selected from a covalent bond, —$(C_mH_{2m})$—C(O)O—, where m=1 to 3, and —C(O)—;
Y is a hydrophilic poly(oxyalkylene) moiety having from 8 to 15 repeat units; and
$R_h$ is a $C_8$–$C_{15}$ alkyl group, an aryl group or combination thereof;
wherein said mixture is present in the thermoplastic polymer at a concentration sufficient to impart hydrophilicity to the polymer;
(b) processing the blend to produce a shaped article with the fluorochemical additive dispersed within the shaped article and present at its surfaces to render those surfaces hydrophilic.

23. The method of claim 22 wherein the thermoplastic polymer is normally hydrophobic and is selected from the group consisting of polyolefin, polyamide, polyester, polyurethane, and blends thereof.

24. The method of claim 22 wherein said fluorochemical additive comprises 0.1 to 5 weight % relative to said composition.

25. The method of claim 22 wherein said thermoplastic polymer comprises a polyolefin polymer or copolymer.

26. The composition of claim 25 wherein said polyolefin comprises a propylene polymer or copolymer.

27. The composition of claim 25 wherein said thermoplastic polymer comprises a polypropylene/polybutylene blend.

28. The method of claim 22 further comprising the step of annealing said shaped article.

29. The composition of claim 8 wherein $R_h$ is 2,6,8-trimethyl-4-nonyl.

30. The composition of claim 1 wherein said additive is selected from
$C_3F_7SO_2N(C_2H_5)(CH_2CH_2O)_xC_8H_{17}$,
$C_3F_7SO_2N(CH_3)(CH_2CH_2O)_xC_8H_{17}$,
$C_4F_9SO_2N(C_2H_5)(CH_2CH_2O)_xC_8H_{17}$,
$C_4F_9SO_2N(CH_3)(CH_2CH_2O)_xC_8H_{17}$,
$C_4F_9SO_2N(CH_3)(CH_2CH_2O)_xCH[CH_2CH(CH_3)_2][CH_2CH(CH_3)CH_2CH(CH_3)_2]$,
$C_4F_9SO_2N(C_2H_5)(CH_2CH_2O)_xCH[CH_2CH(CH_3)_2][CH_2CH(CH_3)CH_2CH(CH_3)_2]$,
$C_3F_7SO_2N(CH_3)(CH_2CH_2O)_xCH[CH_2CH(CH_3)_2][CH_2CH(CH_3)CH_2CH(CH_3)_2]$,
$C_5F_{11}SO_2N(CH_3)(CH_2CH_2O)_xCH[CH_2CH(CH_3)_2][CH_2CH(CH_3)CH_2CH(CH_3)_2]$,
$C_5F_{11}SO_2N(CH_3)(CH_2CH_2O)_xC_{10}H_{21}$,
$C_4F_9SO_2N(CH_3)(CH_2CH_2O)_xC_6H_4$—$C(CH_3)_2$—$CH_2$—$C(CH_3)_3$,
$C_5F_{11}SO_2N(CH_3)(CH_2CH_2O)_xC_{14}H_{29}$,
$C_3F_7SO_2N(CH_3)(CH_2CH_2O)_xC_6H_4$—$C_8H_{17}$,
$C_4F_9SO_2N(CH_3)CH_2CH(OH)CH_2O(CH_2CH_2O)_xC_6H_4C(CH_3)_2$—$CH_2$—$C(CH_3)_3$,
$C_4F_9SO_2N(CH_3)CH_2CH(OH)CH_2O(CH_2CH_2O)_xCH[CH_2CH(CH_3)_2][CH_2CH(CH_3)CH_2CH(CH_3)_2]$, and
$C_4F_9SO_2N(CH_3)(CH_2CH_2O)_xC(O)$—$C_{11}H_{23}$, wherein x for each of the depicted compounds is 8–15.

* * * * *

UNITED STATES PATENT AND TRADEMARK OFFICE
CERTIFICATE OF CORRECTION

PATENT NO. : 7,230,043 B2  Page 1 of 1
APPLICATION NO. : 10/935018
DATED : June 12, 2007
INVENTOR(S) : Thomas P. Klun It is certified that error appears in the above-identified patent and that said Letters Patent is hereby corrected as shown below:

Col. 17
Line 6, delete "ML" and insert -- mL --, therefor.

Col. 21
Line 10, delete "PBO400," and insert -- PB0400, --, therefor.
Line 59, delete "PBO400" and insert -- PB0400 --, therefor.

Signed and Sealed this

Twenty Second Day of April, 2008

JON W. DUDAS
*Director of the United States Patent and Trademark Office*